(12) United States Patent
Lee (10) Patent No.: US 11,772,454 B2
(45) Date of Patent: Oct. 3, 2023

(54) DEVICE AND METHOD FOR CONTROLLING VEHICLE

(71) Applicants: Hyundai Motor Company, Seoul (KR); Kia Corporation, Seoul (KR)

(72) Inventor: Dae Kun Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 301 days.

(21) Appl. No.: 17/374,061

(22) Filed: Jul. 13, 2021

(65) Prior Publication Data

US 2022/0258564 A1 Aug. 18, 2022

(30) Foreign Application Priority Data

Feb. 17, 2021 (KR) .......................... 10-2021-0021377

(51) Int. Cl.
  *B60H 1/00* (2006.01)
(52) U.S. Cl.
  CPC ..... *B60H 1/00771* (2013.01); *B60H 1/00849* (2013.01)

(58) Field of Classification Search
  CPC ............ B60H 1/00771; B60H 1/00849; B60H 1/0073; B60W 40/10; B60W 2520/10; B60W 2555/40; B60W 2556/50
  See application file for complete search history.

(56) References Cited

U.S. PATENT DOCUMENTS

2016/0159201 A1* 6/2016 An ..................... B60H 1/00778
  340/438

* cited by examiner

*Primary Examiner* — Sizo B Vilakazi
(74) *Attorney, Agent, or Firm* — MORGAN, LEWIS & BOCKIUS LLP (57) ABSTRACT

A device configured for controlling a vehicle includes a navigation for receiving a Global Navigation Satellite system (GNSS) signal to determine at least one location of the vehicle, storage for storing a map including a plurality of road links, and a controller that determines whether the vehicle has entered a parking lot based on a result of determining whether a first location of the vehicle is connected to the road link based on the map and a result of determining whether a road link connected to a second location of the vehicle immediately before the first location among the plurality of links is connected to a parking lot entry/exit point, and controls an air conditioner in an internal air mode when it is determined that the vehicle has entered the parking lot, providing a pleasant environment to a driver and a passenger.

20 Claims, 5 Drawing Sheets

DEVICE AND METHOD FOR CONTROLLING VEHICLE

CROSS-REFERENCE TO RELATED APPLICATION

The present application claims priority to Korean Patent Application No. 10-2021-0021377, filed on Feb. 17, 2021, the entire contents of which is incorporated herein for all purposes by this reference.

BACKGROUND OF THE INVENTION

Field of the Invention

The present invention relates to a device and a method for controlling a vehicle.

Description of Related Art

In-vehicle air conditioning modes may be largely divided into an external air circulation mode and an internal air circulation mode. The external air circulation mode refers to introducing external air of a vehicle to release impure air to the outside, and the internal air circulation mode refers to circulating air inside the vehicle. A. A driver or a passenger of the vehicle may set the external air circulation mode or the internal air circulation mode based on an external environment or a location of the vehicle, introducing the external air or blocking the introduction of the external air.

Recently, various devices of the vehicle are automatically controlled to improve a convenience of the driver and the passenger. Thus, there is a need to develop a technology capable of controlling an air conditioner based on the location of the vehicle without control of the driver or the passenger.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device and a method for controlling a vehicle which may determine a location of the vehicle and control a device of the vehicle based on the location.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a device configured for controlling a vehicle includes a navigation for receiving a Global Navigation Satellite system (GNSS) signal to determine at least one location of the vehicle, storage for storing a map including a plurality of road links, and a controller that determines whether the vehicle has entered a parking lot based on a result of determining whether a first location of the vehicle is connected to the road link based on the map and a result of determining whether a road link connected to a second location of the vehicle immediately before the first location among the plurality of links is connected to a parking lot entry/exit point, and controls an air conditioner in an internal air mode when it is determined that the vehicle has entered the parking lot.

In various exemplary embodiments of the present invention, the controller may be configured to determine that the vehicle has entered the parking lot when it is determined that the first location is not connected to the road link and the road link connected to the second location is connected to the parking lot entry/exit point.

In various exemplary embodiments of the present invention, the controller may be configured to determine whether the vehicle has entered the parking lot based on at least one of a change in an altitude of the vehicle or a driving distance without GNSS reception when it is determined that the first location is not connected to the road link and the road link connected to the second location of the vehicle is not connected to the parking lot entry/exit point.

In various exemplary embodiments of the present invention, the controller may be configured to determine whether the driving distance without the GNSS reception exceeds a second set value when it is determined that the change in the altitude of the vehicle does not exceed a first set value.

In various exemplary embodiments of the present invention, the controller may be configured to determine that the vehicle has entered the parking lot when it is determined that the driving distance without the GNSS reception exceeds the second set value.

In various exemplary embodiments of the present invention, the controller may be configured to determine whether a speed of the vehicle exceeds a third set value when the change in the altitude of the vehicle exceeds a first set value.

In various exemplary embodiments of the present invention, the controller may be configured to determine that the vehicle has entered the parking lot when it is determined that the speed of the vehicle does not exceed the third set value.

In various exemplary embodiments of the present invention, the controller may store the road link connected to the second location as a specific road link, and downwardly change the first set value and the second set value when the vehicle is turned off within a predetermined time period after the air conditioner is controlled in the internal air mode.

In various exemplary embodiments of the present invention, the controller may be configured to determine whether the vehicle has entered the parking lot with the downwardly changed first set value and the downwardly changed second set value when the road link connected to the second location among the plurality of road links stored in the storage is identified as the specific road link.

In various exemplary embodiments of the present invention, the controller may be configured to determine which floor of the parking lot the vehicle is located based on an altitude of the vehicle, and provide information corresponding to each floor of the parking lot when the air conditioner is controlled in the internal air mode.

According to various aspects of the present invention, a method for controlling a vehicle includes receiving a GNSS signal to determine at least one location of the vehicle, deriving a first result of determining whether a first location of the vehicle is connected to a road link based on a map storing a plurality of road links, deriving a second result of determining whether a road link connected to a second location of the vehicle immediately before the first location among the plurality of links is connected to a parking lot entry/exit point, determining whether the vehicle has entered a parking lot based on the first result and the second result, and controlling an air conditioner in an internal air mode when it is determined that the vehicle has entered the parking lot.

In various exemplary embodiments of the present invention, the determining of whether the vehicle has entered the parking lot may include determining that the vehicle has entered the parking lot when it is determined that the first location is not connected to the road link and the road link connected to the second location is connected to the parking lot entry/exit point.

In various exemplary embodiments of the present invention, the method may further include determining whether the vehicle has entered the parking lot based on at least one of a change in an altitude of the vehicle and a driving distance without GNSS reception when it is determined that the first location is not connected to the road link and the road link connected to the second location of the vehicle is not connected to the parking lot entry/exit point.

In various exemplary embodiments of the present invention, the method may further include determining whether the driving distance without the GNSS reception exceeds a second set value when it is determined that the change in the altitude of the vehicle does not exceed a first set value.

In various exemplary embodiments of the present invention, the method may further include determining that the vehicle has entered the parking lot when it is determined that the driving distance without the GNSS reception exceeds the second set value.

In various exemplary embodiments of the present invention, the method may further include determining whether a speed of the vehicle exceeds a third set value when the change in the altitude of the vehicle exceeds a first set value.

In various exemplary embodiments of the present invention, the method may further include determining that the vehicle has entered the parking lot when it is determined that the speed of the vehicle does not exceed the third set value.

In various exemplary embodiments of the present invention, the method may further include storing the road link connected to the second location as a specific road link when the vehicle is turned off within a predetermined time period after the air conditioner is controlled in the internal air mode, and downwardly changing the first set value and the second set value.

In various exemplary embodiments of the present invention, the method may further include determining whether the vehicle has entered the parking lot with the downwardly changed first set value and the downwardly changed second set value when the road link connected to the second location among the plurality of road links is identified as the specific road link.

In various exemplary embodiments of the present invention, the method may further include determining which floor of the parking lot the vehicle is located based on an altitude of the vehicle when the air conditioner is controlled in the internal air mode, and providing information corresponding to each floor of the parking lot.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
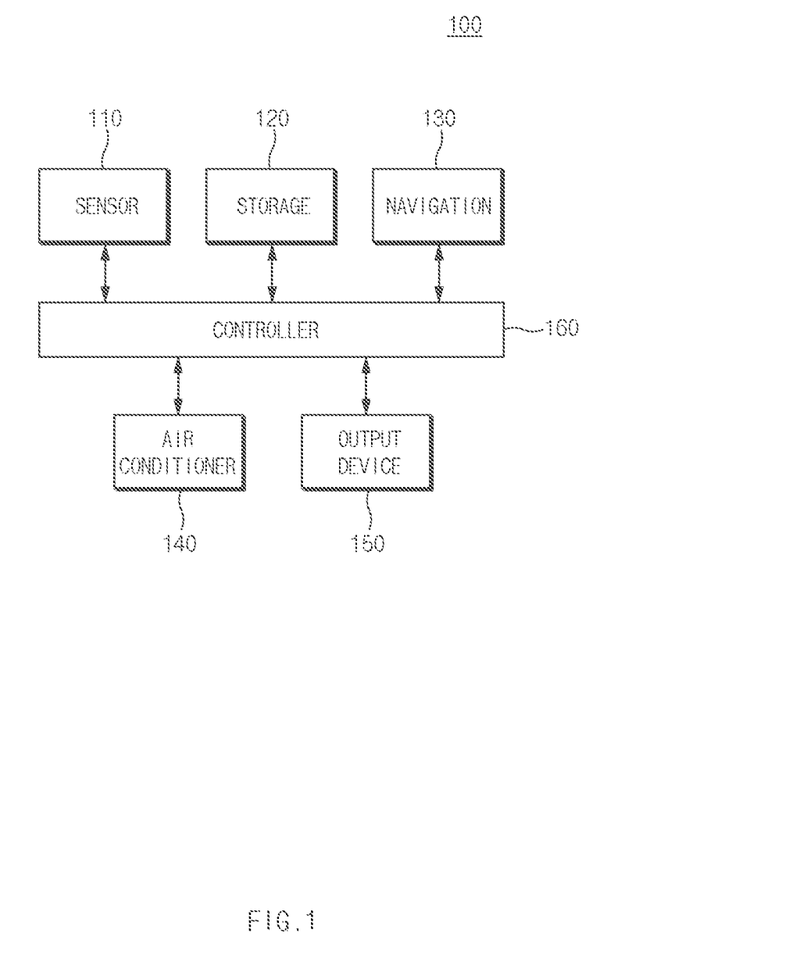
FIG. 1 is a block diagram showing a configuration of a vehicle control device according to various exemplary embodiments of the present invention.

FIG. 1 is a block diagram showing a configuration of a vehicle control device according to various exemplary embodiments of the present invention.

As shown in FIG. 1, a vehicle control device 100 according to various exemplary embodiments of the present invention may include a sensor 110, storage 120, a navigation 130, an air conditioner 140, an output device 150, and a controller 160.

The sensor 110 may acquire travel information of a vehicle. In the present connection, the travel information may include a speed of the vehicle and an angular speed of the vehicle. To the present end, the sensor 110 may be implemented as a vehicle speed sensor, an acceleration sensor, a gyro sensor, and the like. Furthermore, the sensor 110 may include a distance sensor, and may acquire information on surroundings. The information on the surroundings may include a preceding vehicle traveling in front of the vehicle, a road, a stationary object including a structure installed around the road or the like, a vehicle approaching in an opposite line, and the like. Furthermore, the information on the surroundings may include road information (ground surface information) or line information by detecting a signal reflected from a line marking of the road or a ground surface of the road. The sensor 110 according to the exemplary embodiment described above may include a radar or a Light Detection and Ranging (LiDAR).

The storage 120 may store a map including a road link according to various exemplary embodiments of the present invention. In the present connection, the road link may mean a unit constituting the road, and may be partitioned with a boundary of an intersection or a point (a point at which the road meets a place other than the road) specified in advance. As an example, the point specified in advance may include a parking lot entry/exit point. The map may include not only the road link, but also information of the road link configured for identifying a plurality of road links, and information on a structure around the road link. In the present connection, the structure information may include which floors of a building a parking lot is located, and information corresponding to each floor of the parking lot. The information corresponding to each floor may include elevator connection information, business branch connection information, and the like. Furthermore, the storage 120 may store at least one algorithm that performs an operation or an execution of various commands for an operation of the vehicle control device 100 according to various exemplary embodiments of the present invention. The storage 120 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and/or an optical disk.

The navigation 130 may include a Global Navigation Satellite system (GNSS) receiver to receive a GNSS signal from a plurality of GNSS satellites, determining at least one current location of the vehicle. According to various exemplary embodiments of the present invention, current location information may include latitude information and longitude information.

The air conditioner 140 may operate in an external air circulation mode or an internal air circulation mode under control of the controller 160. In the present connection, the external air circulation mode refers to introducing external air of the vehicle to release impure air to the outside, and the internal air circulation mode refers to circulating air inside the vehicle.

The output device 150 may visually display or audibly indicate a control result of the controller 160. According to various exemplary embodiments of the present invention, the output device 150 may include a display and a sound output device, and may be implemented integrally with the navigation 130. The display may include a touch screen panel, and the sound output device may include a speaker.

The controller 160 may be implemented by various processing devices such as a microprocessor having an embedded semiconductor chip or the like configured for performing the operation or the execution of the various commands, and may control the operation of the vehicle control device according to various exemplary embodiments of the present invention. Specifically, the controller 160 may control the vehicle device based on the location of the vehicle.

The controller 160 may receive the GNSS signal from the GNSS satellite, and acquire the at least one current location of the vehicle determined based on the received GNSS signal. Furthermore, the controller 160 may determine whether a first location (e.g., the current location) of the vehicle is connected to the road link by matching the received GNSS signal with the map.

When it is determined that the first location of the vehicle is connected to the road link, the controller 160 may determine that the vehicle is located on the road at the first location. However, when it is determined that the first location of the vehicle is not connected to the road link, the controller 160 may determine that the vehicle is located in the place other than the road. In the present connection, the place other than the road may include a place where the road is not formed.

When it is determined that the first location of the vehicle is not connected to the road link, the controller 160 may determine whether a road link connected to a second location of the vehicle, which is a location at a time immediately before the vehicle reaches the first location, is connected to the parking lot entry/exit point. That is, the controller 160 may determine whether a last road link included in a route traveled immediately before the vehicle enters the place other than the road is connected to the parking lot entry/exit point.

When it is determined that the road link connected to the second location of the vehicle, which is the location at the time immediately before the vehicle reaches the first location, is connected to the parking lot entry/exit point, the controller 160 may determine that the vehicle has entered a parking lot (an enclosed-type parking lot), and in the instant case, control the air conditioner of the vehicle in an internal air mode.

On the other hand, when it is determined that the road link connected to the second location of the vehicle is not connected to the parking lot entry/exit point, the controller 160 may determine whether the vehicle has entered the parking lot based on at least one of a change in an altitude of the vehicle or a distance at which the GNSS signal has not been received. According to various exemplary embodiments of the present invention, the controller 160 may determine whether the change in the altitude of the vehicle exceeds a first set value and whether the distance at which the GNSS signal has not been received exceeds a second set value. In the present connection, the first set value and the second set value may be set to vary based on a surrounding environment of the vehicle (e.g., surrounding vehicle and road information).

When it is determined that the change in the altitude of the vehicle exceeds the first set value, the controller 160 may determine that the change in the altitude of the vehicle has occurred, and may determine that the vehicle has entered a parking (the enclosed-type parking lot) lot at a vertical level higher or lower than the ground surface. In the instant case, the controller 160 may control the air conditioner of the vehicle in the internal air mode.

According to various exemplary embodiments of the present invention, when the vehicle is traveling on an uphill road where the road link is not connected because the map has not been updated, the controller 160 may determine whether a vehicle speed exceeds a third set value (e.g., 50 km/h) when the change in the altitude of the vehicle exceeds the first set value such that it is not erroneously determined that the vehicle has entered the parking lot. That is, when it is determined that the vehicle speed exceeds the third set value, the controller 160 should determine that the vehicle is traveling on the uphill road to which the road link is not connected such that it is not erroneously determined that the vehicle has entered the parking lot. On the other hand, when the vehicle speed does not exceed the third set value, the controller 160 may determine that the vehicle is moving slowly within the parking lot, determining that the vehicle has entered the parking lot.

On the other hand, when it is determined that the change in the altitude of the vehicle does not exceed the first set value, the controller 160 may determine whether the distance at which the GNSS signal has not been received exceeds the second set value. The determination, by the controller 160, that the distance at which the GNSS signal has not been received exceeds the second set value is desirable to be understood that a distance the vehicle has moved in a state in which the GNSS signal has not been received, that is, at a place where the GNSS signal has not been received exceeds the second set value. According to various exemplary embodiments of the present invention, it is desirable that the place where the GNSS signal has not been received is interpreted as the parking lot (the enclosed-type parking lot). When it is determined that a distance moved in the parking lot where the GNSS signal has not been received exceeds the second set value, the controller 160 may determine that the vehicle has entered the parking lot, and control the air conditioner of the vehicle in the internal air mode. When it is determined that the distance at which the GNSS signal has not been received does not exceed the second set value, the controller 160 may determine that the GNSS signal is received to an extent that the location of the vehicle may be determined. The controller 160 may match the received GNSS signal with the map to determine whether the vehicle has entered the road again.

When it is determined that the vehicle has entered the road again, the controller 160 may initialize the first set value and the second set value. Furthermore, when it is determined that the vehicle has not entered the road again, the controller 160 may reset the first set value based on the surrounding environment and determine the change in the altitude of the vehicle again. According to various exemplary embodiments of the present invention, when it is determined that the vehicle is turned off within a predetermined time period (e.g., 20 to 30 minutes) after determining that the vehicle has entered the parking lot and controlling the air conditioner in the internal air mode, the controller 160 may store the road link connected to the second location as a specific road link to allow the specific road link to be identified. Furthermore, the controller 160 may downwardly change the first set value and the second set value to correspond to the specific road link. Therefore, when the vehicle enters a parking lot connected to the specific road link again after the specific road link is stored, because whether the vehicle has entered the parking lot is determined based on the downwardly changed first set value and the downwardly changed second set value, whether the vehicle has entered the parking lot may be determined rapidly. Accordingly, the controller 160 may control the air conditioner early after the vehicle enters the parking lot.

According to various exemplary embodiments of the present invention, when it is determined that the vehicle has entered the parking lot as the road link immediately before the current location is connected to the parking lot entry/exit point, the change in the altitude of the vehicle exceeds the first set value, or the distance at which the GNSS signal has not been received exceeds the second set value, the controller 160 may determine the altitude based on information acquired by the gyro sensor of the vehicle and determine which floor of the parking lot the vehicle is located based on the altitude of the vehicle. Furthermore, the controller 160 may provide information related to which floor of the parking lot the vehicle is located. As an example, when it is determined that the vehicle is located on a third floor of an underground parking lot, the controller 160 may output information related to the third floor of the underground parking lot (e.g., indicating that the 3rd basement floor is connected to a theater) through the output device 150.

Figure 2:
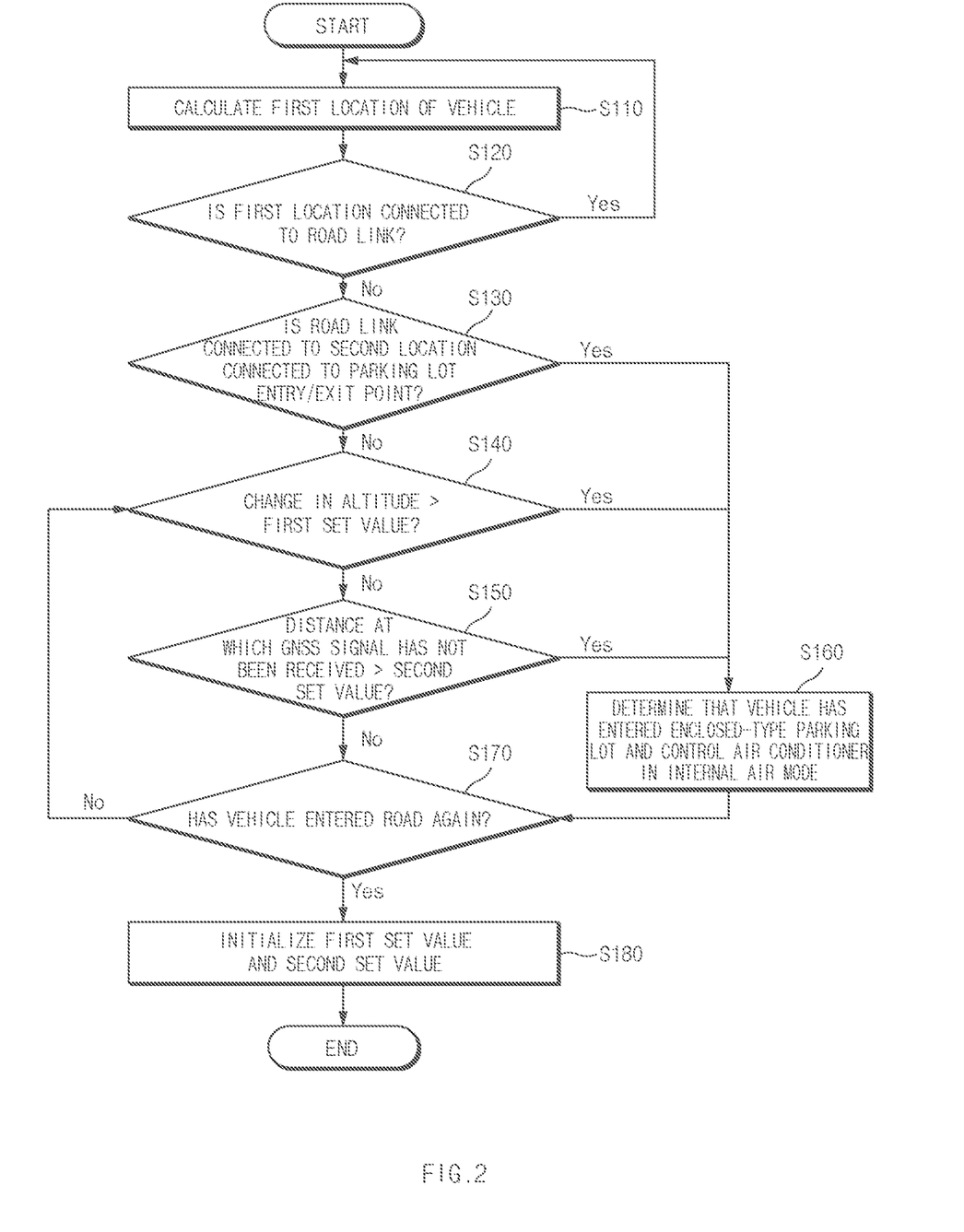
FIG. 2, FIG. 3, FIG. 4 and FIG. 5 are flowcharts illustrating a vehicle control method according to various exemplary embodiments of the present invention.

FIG. 2 is a flowchart showing a vehicle control method according to various exemplary embodiments of the present invention.

As shown in FIG. 2, the controller 160 may receive the GNSS signal from the GNSS satellite, and acquire the first location (e.g., the current location) of the vehicle determined based on the received GNSS signal (S110). The controller 160 may determine whether the first location of the vehicle is connected to the road link (S120). In S120, the controller 160 may determine whether the road link exists at the current location of the vehicle by matching the received GNSS signal with the map. When it is determined in S120 that the first location of the vehicle is connected to the road link (Y), the controller 160 may determine that the vehicle is currently located on the road. However, when it is determined in S120 that the first location of the vehicle is not connected to the road link (N), the controller 160 may determine that the vehicle is located in the place other than the road. In the present connection, the place other than the road may include the place where the road is not formed.

When it is determined in S120 that the first location of the vehicle is not connected to the road link (N), the controller 160 may determine whether the road link connected to the second location of the vehicle, which is the location at the time immediately before the vehicle reaches the first location, is connected to the parking lot entry/exit point (S130). In S130, the controller 160 may determine whether the last road link included in the route traveled immediately before the vehicle enters the place other than the road is connected to the parking lot entry/exit point.

When it is determined in S130 that the road link connected to the second location of the vehicle is connected to the parking lot entry/exit point (Y), the controller 160 may determine that the vehicle has currently entered the parking lot (the enclosed-type parking lot), and in the instant case, control the air conditioner of the vehicle in the internal air mode (S160).

On the other hand, when it is determined in S130 that the road link connected to the second location of the vehicle is not connected to the parking lot entry/exit point (N), the controller 160 may determine whether the change in the altitude of the vehicle exceeds the first set value (S140). In the present connection, the first set value may be set to vary based on the surrounding environment of the vehicle (e.g., the surrounding vehicle and road information).

When it is determined in S140 that the altitude change of the vehicle exceeds the first set value (Y), the controller 160 may determine that the change in the altitude of the vehicle has occurred, and may determine that the vehicle has entered the parking lot (the enclosed-type parking lot) at the vertical level higher or lower than the ground surface. In the instant case, the controller 160 may control the air conditioner of the vehicle in the internal air mode (S160).

On the other hand, when it is determined in S140 that the change in the altitude of the vehicle does not exceed the first set value (N), the controller 160 may determine whether the distance at which the GNSS signal has not been received exceeds the second set value (S150). In the present connection, the second set value may be set to vary based on the surrounding environment of the vehicle (e.g., the surrounding vehicle and road information).

When it is determined in S150 that the distance at which the GNSS signal has not been received exceeds the second set value (Y), it is desirable to be understood that the distance the vehicle has moved in the state in which the GNSS signal has not been received, that is, at the place where the GNSS signal has not been received exceeds the second set value. According to various exemplary embodiments of the present invention, the place where the GNSS signal has not been received is preferably understood as the parking lot (the enclosed-type parking lot). When it is determined that the distance moved in the parking lot where the GNSS signal has not been received exceeds the second set value, the controller 160 may control the air conditioner of the vehicle in the internal air mode (S160).

On the other hand, when it is determined in S150 that the distance at which the GNSS signal has not been received does not exceed the second set value (N), the controller 160 may determine that the GNSS signal is received to the extent that the location of the vehicle may be determined, and may match the received GNSS signal with the map to determine whether the vehicle has entered the road again (S170).

When it is determined in S170 that the vehicle has entered the road again (Y), the controller 160 may initialize the first set value and the second set value (S180). Furthermore, when it is determined in S170 that the vehicle has not entered the road again (N), the controller 160 may reset the first set value based on the surrounding environment and determine the change in the altitude of the vehicle again (S140).

Figure 3:
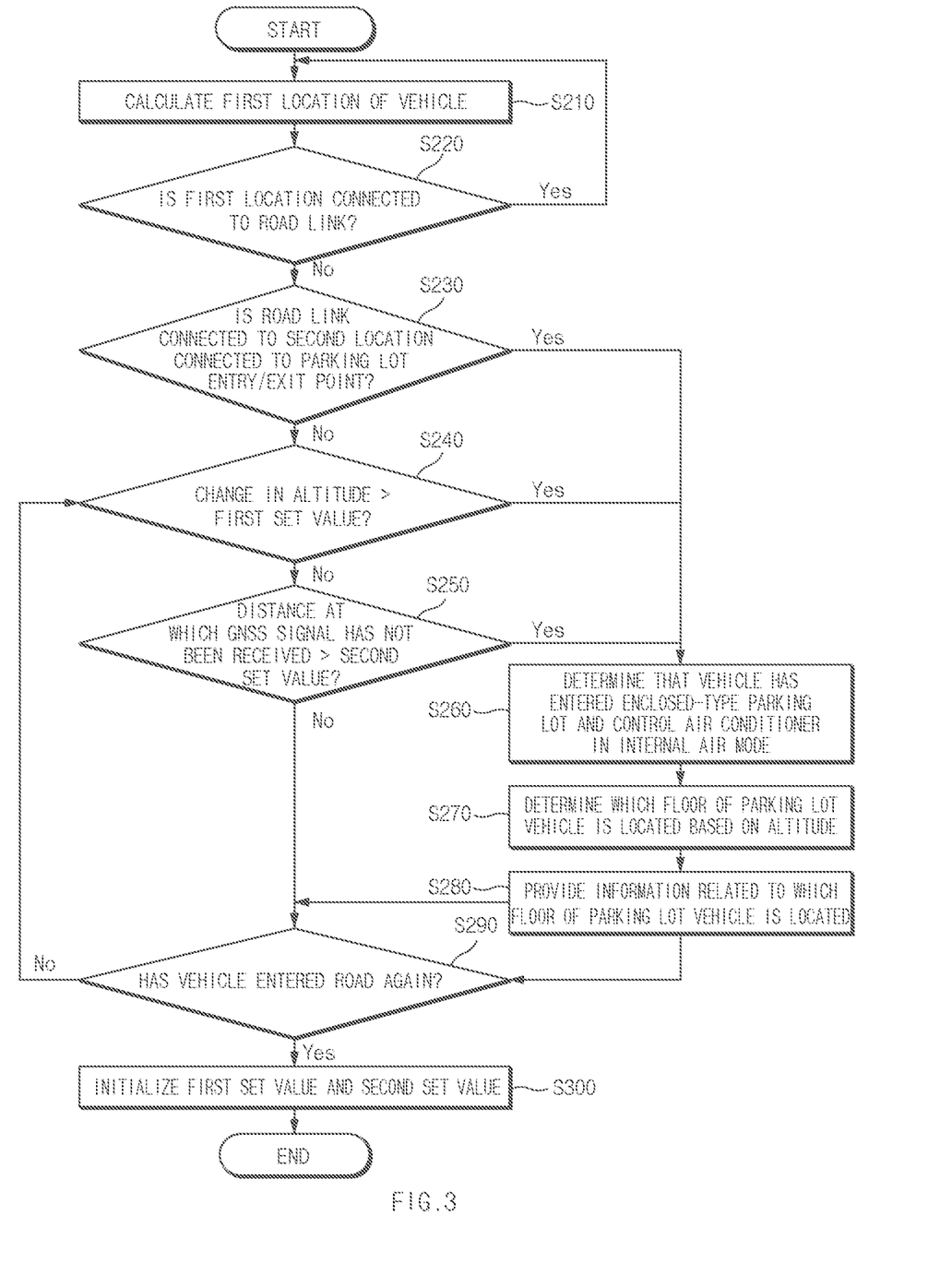

FIG. 3 is a flowchart showing a vehicle control method according to various exemplary embodiments of the present invention.

Operations of S210 to S260 and S290 to S300 of FIG. 3 will be described with reference to the description of the operations of S110 to S180 of FIG. 2. When it is determined that the vehicle has entered the parking lot (S260) as the road link connected to the second location of the vehicle is connected to the parking lot entry/exit point (Y) in S230, the change in the altitude of the vehicle exceeds the first set value (Y) in S240, or the distance at which the GNSS signal has not been received exceeds the second set value (Y) in S250, the controller 160 may determine the altitude based on the information acquired by the gyro sensor of the vehicle and determine which floor of the parking lot the vehicle is located based on the altitude of the vehicle (S270). Furthermore, the controller 160 may provide the information related to which floor of the parking lot the vehicle is located (S280). As an example, when it is determined in S280 that the vehicle is located on the third floor of the underground parking lot, the controller 160 may output the information related to the third floor of the underground parking lot (e.g., indicating that the 3rd basement is connected to the theater) through the output device 150.

Figure 4:
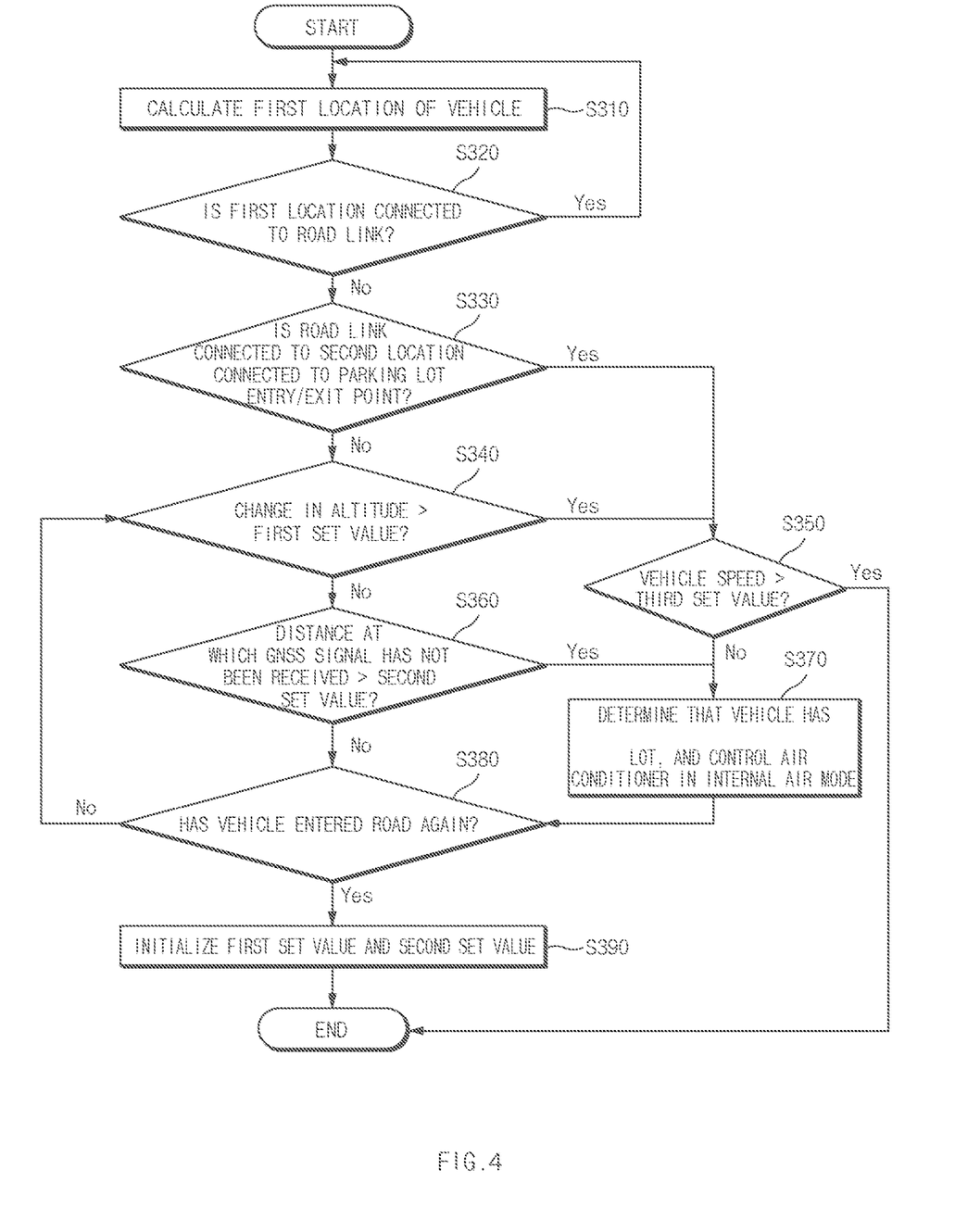

FIG. 4 is a diagram showing a vehicle control method according to various exemplary embodiments of the present invention.

Operations of S310 to S340 of FIG. 4 will be described with reference to the description of the operations of S110 to S140 of FIG. 2, and operations of S360 to S390 will be described with reference to the description of the operations of S150 to S180. When it is determined in S340 that the change in the altitude of the vehicle exceeds the first set value (Y), the controller 160 may determine whether the vehicle speed exceeds the third set value (e.g., 50 km/h) (S350). When it is determined in S350 that the vehicle speed exceeds the third set value (Y), the controller 160 may terminate the operation such that it is not erroneously determined that the vehicle has entered the parking lot. On the other hand, when it is determined in S350 that the vehicle speed does not exceed the third set value (N), the controller 160 may determine that the vehicle is moving slowly within the parking lot, determining that the vehicle has entered the parking lot, and controlling the air conditioner in the internal air mode (S370).

Figure 5:
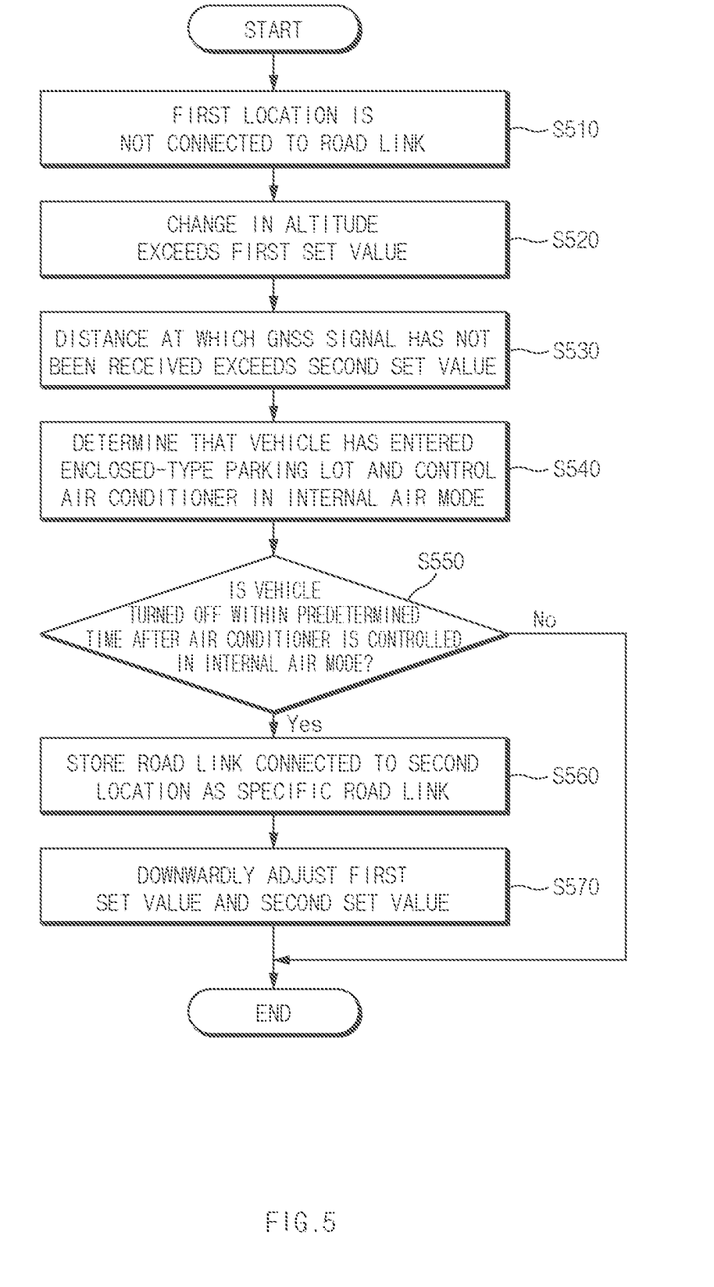

FIG. 5 is a diagram showing a vehicle control method according to various exemplary embodiments of the present invention.

As shown in FIG. 5, when it is determined that the first location determined by the vehicle is not connected to the road link (S510), it is determined that the change in the altitude of the vehicle exceeds the first set value (S520), and it is determined that the distance at which the GNSS signal has not been received exceeds the second set value (S530), the controller 160 may determine that the vehicle has entered the parking lot and control the air conditioner in the internal air mode (S540).

After the air conditioner of the vehicle is controlled in the internal air mode, the controller 160 may determine whether the vehicle is turned off within the predetermined time period (e.g., 20 minutes to 30 minutes) (S550). When it is determined in S550 that the vehicle is turned off after the air conditioner of the vehicle is controlled in the internal air mode (Y), the controller 160 may store the road link connected to the second location, which is the location at the time immediately before the vehicle reaches the first location, as the specific road link (S560). Furthermore, the controller 160 may downwardly change the first set value and the second set value to correspond to the specific road link (S570).

When the controller 160 enters the parking lot connected to the specific road link again after S570, the controller 160 may determine whether the vehicle has entered the parking lot based on the downwardly changed first set value and the downwardly changed second set value.

The description above is merely illustrative of the technical idea of the present invention, and various modifications and changes may include those skilled in the art without departing from the essential characteristics of the present invention.

Therefore, the embodiments disclosed in various exemplary embodiments of the present invention are not intended to limit the technical idea of the present invention but to illustrate the present invention, and the scope of the technical idea of the present invention is not limited by the embodiments. The scope of the present invention should be construed as being covered by the scope of the appended claims, and all technical ideas falling within the scope of the claims should be construed as being included in the scope of the present invention.

The device and the method for controlling the vehicle according to various exemplary embodiments of the present invention may determine whether the vehicle has entered the parking lot. Furthermore, a pleasant environment may be provided to the driver and the passenger by controlling the device of the vehicle based on the determination result, and information of the building where the parking lot is located may be provided.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for controlling a vehicle, the device comprising:
   a navigation for receiving a Global Navigation Satellite system (GNSS) signal to determine at least one location of the vehicle;
   a storage for storing a map including a plurality of road links; and
   a controller connected to the navigation and the storage and configured to:
      determine whether the vehicle has entered a parking lot according to a result of determining whether a first location of the vehicle is connected to a road link among the plurality of road links according to the map and a result of determining whether a road link connected to a second location of the vehicle immediately before the first location among the plurality of links is connected to a parking lot entry/exit point; and
      control an air conditioner of the vehicle in an internal air mode when the controller concludes that the vehicle has entered the parking lot.

2. The device of claim 1, wherein the controller is configured to conclude that the vehicle has entered the parking lot when the controller determines that the first location is not connected to the road link and the road link connected to the second location is connected to the parking lot entry/exit point.

3. The device of claim 1, wherein the controller is configured to determine whether the vehicle has entered the parking lot according to at least one of a change in an altitude of the vehicle or a driving distance without GNSS reception when the controller concludes that the first location is not connected to the road link and the road link connected to the second location of the vehicle is not connected to the parking lot entry/exit point.

4. The device of claim 3, wherein the controller is configured to determine whether the driving distance without the GNSS reception exceeds a second set value when the controller concludes that the change in the altitude of the vehicle does not exceed a first set value.

5. The device of claim 4, wherein the controller is configured to conclude that the vehicle has entered the parking lot when the controller determines that the driving distance without the GNSS reception exceeds the second set value.

6. The device of claim 3, wherein the controller is configured to determine whether a speed of the vehicle exceeds a third set value when the change in the altitude of the vehicle exceeds a first set value.

7. The device of claim 6, wherein the controller is configured to conclude that the vehicle has entered the parking lot when the controller determines that the speed of the vehicle does not exceed the third set value.

8. The device of claim 4, wherein the controller is configured to store the road link connected to the second location as a specific road link, and downwardly change the first set value and the second set value when the vehicle is turned off within a predetermined time period after the air conditioner is controlled in the internal air mode.

9. The device of claim 8, wherein the controller is configured to determine whether the vehicle has entered the parking lot with the downwardly changed first set value and the downwardly changed second set value when the road link connected to the second location among the plurality of road links stored in the storage is identified as the specific road link.

10. The device of claim 1, wherein the controller is configured to determine which floor of the parking lot the vehicle is located on according to an altitude of the vehicle, and provide information corresponding to each floor of the parking lot when the air conditioner is controlled in the internal air mode.

11. A method for controlling a vehicle, the method comprising:
receiving, by a controller, a Global Navigation Satellite system (GNSS) signal to determine at least one location of the vehicle;
deriving, by the controller, a first result of determining whether a first location of the vehicle is connected to a road link according to a map storing a plurality of road links;
deriving, by the controller, a second result of determining whether a road link connected to a second location of the vehicle immediately before the first location among the plurality of links is connected to a parking lot entry/exit point;
determining, by the controller, whether the vehicle has entered a parking lot according to the first result and the second result; and
controlling, by the controller, an air conditioner in an internal air mode when the controller concludes that the vehicle has entered the parking lot.

12. The method of claim 11, wherein the determining of whether the vehicle has entered the parking lot includes:
concluding that the vehicle has entered the parking lot when the controller determines that the first location is not connected to the road link and the road link connected to the second location is connected to the parking lot entry/exit point.

13. The method of claim 11, further including:
determining whether the vehicle has entered the parking lot according to at least one of a change in an altitude of the vehicle and a driving distance without GNSS reception when the controller concludes that the first location is not connected to the road link and the road link connected to the second location of the vehicle is not connected to the parking lot entry/exit point.

14. The method of claim 13, further including:
determining whether the driving distance without the GNSS reception exceeds a second set value when the controller concludes that the change in the altitude of the vehicle does not exceed a first set value.

15. The method of claim 14, further including:
concluding that the vehicle has entered the parking lot when the controller determines that the driving distance without the GNSS reception exceeds the second set value.

16. The method of claim 13, further including:
determining whether a speed of the vehicle exceeds a third set value when the change in the altitude of the vehicle exceeds a first set value.

17. The method of claim 16, further including:
concluding that the vehicle has entered the parking lot when the controller determines that the speed of the vehicle does not exceed the third set value.

18. The method of claim 14, further including:
storing the road link connected to the second location as a specific road link when the vehicle is turned off within a predetermined time period after the air conditioner is controlled in the internal air mode; and
downwardly changing the first set value and the second set value.

19. The method of claim 18, further including:
determining whether the vehicle has entered the parking lot with the downwardly changed first set value and the downwardly changed second set value when the road link connected to the second location among the plurality of road links is identified as the specific road link.

20. The method of claim 11, further including:
determining which floor of the parking lot the vehicle is located on according to an altitude of the vehicle when the air conditioner is controlled in the internal air mode; and
providing information corresponding to each floor of the parking lot.

* * * * *